(12) United States Patent
Wang et al.

(10) Patent No.: US 10,123,236 B2
(45) Date of Patent: Nov. 6, 2018

(54) MOBILE COMMUNICATION SYSTEM, LOCAL ACCESS SERVER AND NETWORK CONTROLLER

(71) Applicant: CHINA ACADEMY OF TELECOMMUNICATIONS TECHNOLOGY, Beijing (CN)

(72) Inventors: Hucheng Wang, Beijing (CN); Shanzhi Chen, Beijing (CN); Hui Xu, Beijing (CN); Ming Ai, Beijing (CN); Fei Qin, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 15/326,461

(22) PCT Filed: Jun. 10, 2015

(86) PCT No.: PCT/CN2015/081162
§ 371 (c)(1),
(2) Date: Jan. 13, 2017

(87) PCT Pub. No.: WO2016/008345
PCT Pub. Date: Jan. 21, 2016

(65) Prior Publication Data
US 2017/0208506 A1    Jul. 20, 2017

(30) Foreign Application Priority Data
Jul. 17, 2014    (CN) .......................... 2014 1 0342248

(51) Int. Cl.
*H04W 4/00* (2018.01)
*H04W 28/24* (2009.01)
(Continued)

(52) U.S. Cl.
CPC ............. *H04W 28/24* (2013.01); *H04L 45/02* (2013.01); *H04W 12/06* (2013.01); *H04W 24/08* (2013.01);
(Continued)

(58) Field of Classification Search
CPC ........ H04W 28/24; H04W 12/06; H04L 45/02
(Continued)

(56) References Cited

U.S. PATENT DOCUMENTS

2011/0228750 A1* 9/2011 Tomici .................. H04W 8/082
370/338
2013/0176850 A1 7/2013 Mishra et al.

FOREIGN PATENT DOCUMENTS

CN    101959176 A    1/2011
CN    102026400 A    4/2011
(Continued)

OTHER PUBLICATIONS

International Search Report for PCT/CN2015/081162 dated Sep. 11, 2015 and its English translation provided by WIPO.
(Continued)

*Primary Examiner* — Nghi H Ly
(74) *Attorney, Agent, or Firm* — Ladas & Parry, LLP

(57) ABSTRACT

The present disclosure provides a mobile communication system, including: a local access server configured to achieve a multi-RATs coordination function, a local access function and distributed network control; a network control function including a communication control function for communication control and a policy control function for policy control; and a network controller configured to establish and configure a forwarding path.

19 Claims, 8 Drawing Sheets

(51) Int. Cl.
  *H04W 76/10* (2018.01)
  *H04W 48/18* (2009.01)
  *H04L 12/751* (2013.01)
  *H04W 12/06* (2009.01)
  *H04W 24/08* (2009.01)
  *H04W 28/26* (2009.01)
  *H04W 64/00* (2009.01)

(52) U.S. Cl.
  CPC .......... *H04W 28/26* (2013.01); *H04W 48/18* (2013.01); *H04W 64/00* (2013.01); *H04W 76/10* (2018.02)

(58) Field of Classification Search
  USPC .................. 455/435.2, 436, 442, 422.1, 418
  See application file for complete search history.

(56) References Cited

FOREIGN PATENT DOCUMENTS

| | | |
|---|---|---|
| WO | 2005/048081 A2 | 5/2005 |
| WO | 2010/104921 A1 | 9/2010 |
| WO | 2012177213 A2 | 12/2012 |

OTHER PUBLICATIONS

Written Opinion of the International Search Authority for PCT/CN2015/081162 dated Sep. 11, 2015 and its machine English translation from Bing.com translator.
From PCT/CN2015/081162, Written Opinion dated Sep. 11, 2015 and its English translation provided by WIPO.
From PCT/CN2015/081162, International Preliminary Report on Patentability (IPRP) Ch. 1 dated Jan. 17, 2017 and its English translation provided by WIPO.
From EPO Application No. 15822724.9, European Supplementary Search Report and Search Opinion dated Jun. 20, 2017.
Ali-Ahmad Hassan et al: "Crowd: An SDN Approach for DenseNets", 2013 Second European Workshop on Software Defined Networks, IEEE, Oct. 10, 2013, pp. 25-31.
Ali-Ahmad Hassan et al: "An SDN-Based Network Architecture for Extremely Dense Wireless Networks", 2013 IEE SDN for Future Networks and Services (SDN4FNS), Nov. 11, 2013, pp. 1-7.

* cited by examiner

MOBILE COMMUNICATION SYSTEM, LOCAL ACCESS SERVER AND NETWORK CONTROLLER

CROSS-REFERENCE TO RELATED APPLICATIONS

This application is the U.S. national phase of PCT Application No. PCT/CN2015/081162 filed on Jun. 10, 2015, which claims a priority of the Chinese Patent Application No. 201410342248.6 filed on Jul. 17, 2014, the disclosures of which are incorporated in their entirety by reference herein.

TECHNICAL FIELD

The present disclosure relates to the field of communication technology, in particular to a mobile communication system, a local access server and a network controller.

BACKGROUND

Currently, the mobile communication technology is developing quickly and becomes more and more mature along with the standardization thereof. A current communication system architecture will be described hereinafter briefly.

(1) Evolved Packet System (EPS) Network Architecture

As shown in FIG. 1, an EPS network architecture comprises such entities as a Home Subscriber Server (HSS), a Serving Gateway (SG), a Serving GPRS (General Packet Radio Service) Support Node (SGSN), a Universal Terrestrial Radio Access Network (UTRAN), an Evolved-UTRAN (E-UTRAN), a Mobile Management Entity (MME), a GSM (Global System for Mobile Communications) EDGE Radio Access Network (GERAN), a Public Data Network (PDN) Gateway and a Policy and Charging Rules Function (PCRF). These entities may communicate with each other via various interfaces. In the architecture as shown in FIG. 1, the MME, as a control plane node in a Long Term Evolution (LTE) system, mainly takes charge of controlling all mobile management processes and session management processes in the network. In other words, the processing of the signaling for the mobile management processes and the control over the signaling for the session management processes may be completed by the MME in the network.

It is found that, the load on the MME is obviously too large for the EPS architecture. In the case of a large number of terminals that have accessed to the network, such a centralized network control management for the EPS architecture may easily lead to single-point failures, i.e., the overload may occur for the MME. At this time, network congestion or collapse may occur.

(2) GPRS Network Architecture

As shown in FIG. 2, for a $3^{rd}$-Generation (3G) network, an access network consists of a NodeB, and a Radio network controller (RNC) which is mainly configured to forward control signaling and data between the NodeB and a Core Network.

In the 3G network, the core network may take charge of the control over the mobile management and the session management. The SGSN in FIG. 1 has both a control plane function and a user plane function. The SGSN may take charge of all the mobile management processes (including an Attach process, a Tracking Area Update (TAU) process, a Service Request process, a Paging process, a Handover process, a Detach process, etc.) and all the session management processes (including, e.g., the establishment, maintenance and removal of PDN connection and EPS bearer, and the modification of bearer Quality of Service (QoS), and it is also capable of forwarding the user plane-oriented data.

It is found that, the load on the core network is also too large for the GPRS architecture, and in the case of a large number of users and services, the network congestion or collapse may easily occur.

(3) Software Defined Network (SDN) and Network Function Virtualization Network Architecture On one hand, as shown in FIG. 3, for the SDN network architecture, network resources may be scheduled by an application layer, to some extent, through programming due to the separation of the control plane from a forwarding plane. However, for the SDN itself, the mobile management process and the session management process are too complex, like that in the centralized network architecture.

On the other hand, as shown in FIG. 4, for the NFV network architecture, network devices may be used universally to some extent due to the virtualization of underlying physical hardware resources, and they may be used to extend the network to some extent due to the orchestration of the network functions, so as to make the network heterogeneity possible. However, it is merely able for the NFV network to cancel the difference among the hardware devices from an Information Technology (IT) perspective, thereby to enable the mobile communication network to be deployed on a general-purpose hardware platform. In other words, problems may still occur for the convergence and collaboration of heterogeneous networks.

In a word, for the EPS, GPRS, SDN and NFV network architectures, in the case of a large number of terminals that have accessed to the network, the above-mentioned centralized control scheme in the traditional mobile communication network is expensive and inefficient. In addition, the network capacity is limited and the signaling overhead is large.

Hence, it is impossible for the current network architecture to effectively deal with such situations where a large number of terminals have accessed the network and a large number of burst services occur, i.e., the current network architecture cannot be adapted to the future network, and no effective scheme have been proposed yet.

SUMMARY (1) Technical Problem to be Solved

An object of the present disclosure is to provide a mobile communication system, so as to expand the network capacity and reduce the signaling overhead.

(2) Technical Solution

In one aspect, the present disclosure provides in some embodiments a local access server, including: a reception module configured to receive a request from a terminal; a determination module configured to determine, on the basis of the request type, whether or not the request needs to be forwarded to a first control module of a network controller; a transmission module configured to, in the case of a positive determination result, forward the request to the first control module; and a processing module configured to, in the case of a negative determination result, process and respond to the request from the terminal.

In another aspect, the present disclosure provides in some embodiments a network controller, including: a first control module configured to realize a communication control function and a policy control function, receive a connection/session establishment request from a local access server, calculate a QoS parameter in accordance with user subscription data and/or service characteristics, establish a forwarding path in accordance with the QoS parameter, and request the local access server to establish a radio connection using the QoS parameter; and a path establishment module configured to establish and configure the forwarding path.

In yet another aspect, the present disclosure provides in some embodiments an implementation method for mobile communication, including steps of: receiving, by a local access server, a request from a terminal; determining, by the local access server, whether or not the request needs to be forwarded to a first control module on the basis of the request type; and if yes, forwarding, by the local access network, the request to the first control module, otherwise processing and responding to, by the local access server, the request from the terminal.

In still yet another aspect, the present disclosure provides in some embodiments an implementation method for mobile communication, including steps of: receiving a connection/session establishment request from a local access server; calculating a QoS parameter in accordance with user subscription data and/or service characteristics, and establishing a forwarding path in accordance with the QoS parameter; and requesting the local access server to establish a radio connection using the QoS parameter.

In still yet another aspect, the present disclosure provides in some embodiments a mobile communication system, including: a local access server configured to realize a multi-access coordination function, a local access function and the distributed network control; and a network controller configured to realize a communication control function and a policy control function, and establish and configure a forwarding path.

(3) Beneficial Effect

According to the embodiments of the present disclosure, through the introduction of the local access server, the network control function and the network controller, it is able to effectively relieve the service processing burden of the core network, expand the network capacity and reduce the signaling overhead.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
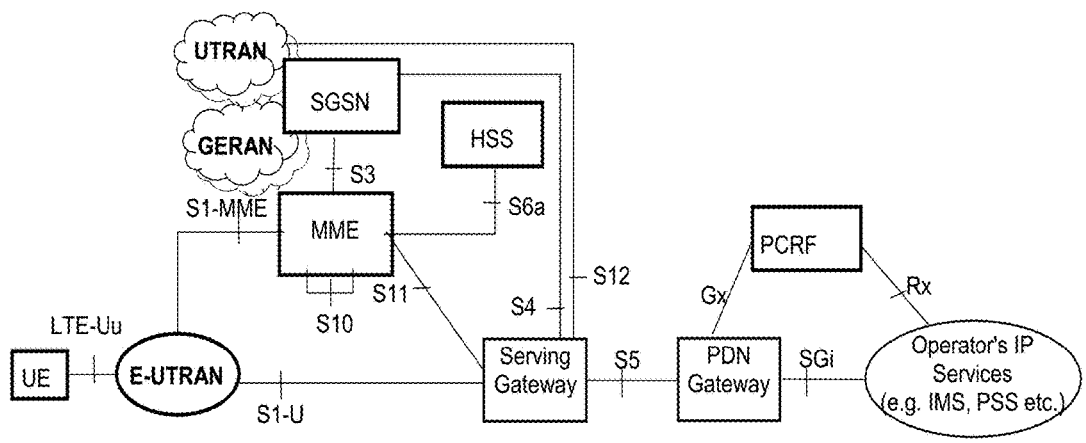
FIG. 1 is a schematic view showing an existing EPS network architecture.
Figure 2:
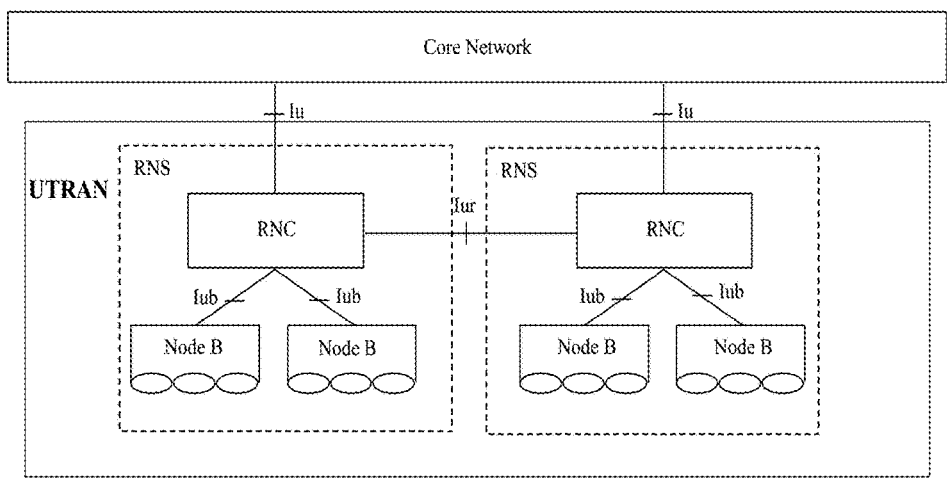
FIG. 2 is a schematic view showing an existing GPRS network architecture.
Figure 3:
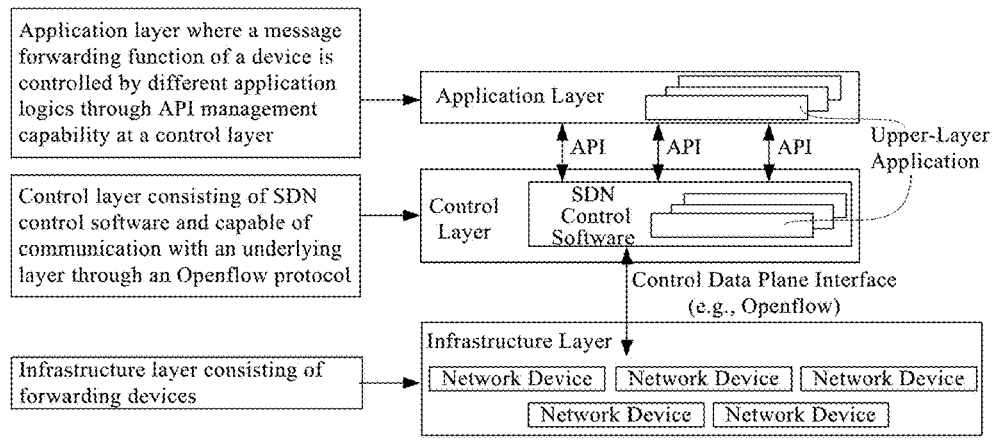
FIG. 3 is a schematic view showing an existing SDN network architecture.
Figure 4:
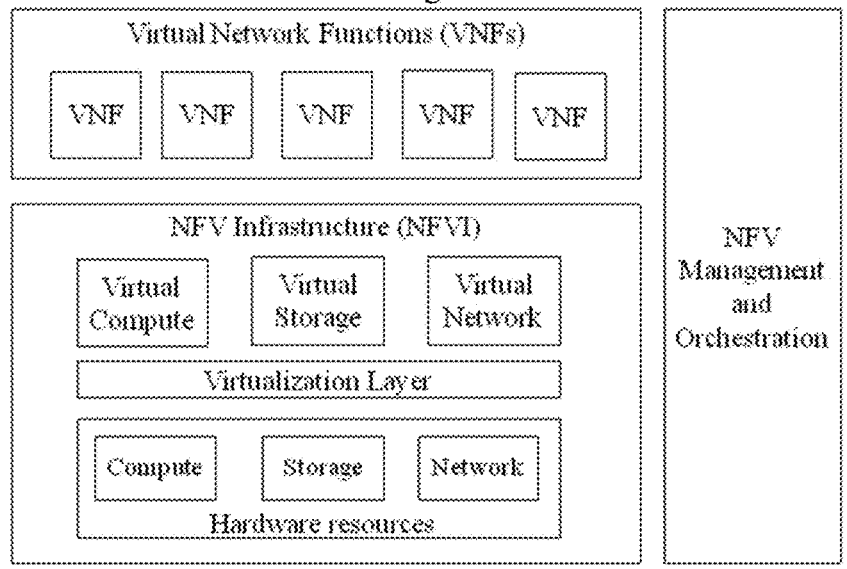
FIG. 4 is a schematic view showing an existing NFV network architecture.
Figure 5:
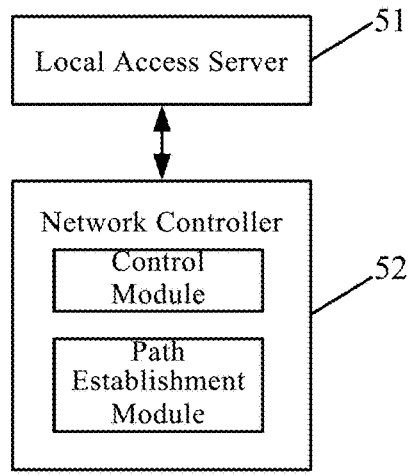
FIG. 5 is a block diagram of a mobile communication system according to one embodiment of the present disclosure.

The present disclosure provides in some embodiments a mobile communication system which, as shown in FIG. 5, includes: a local access server 51 configured to implement a multi-access coordination function, a local access function and the distributed network control; and a network controller 52 configured to establish and configure a forwarding path (e.g., a user plane path). The network controller may include a control module (also called as network control function hereinafter) and a path establishment module. The control module includes a communication control function for communication control and a policy control function for policy control. The control module, as a body for the communication control and the policy control, may serve as an accessory device of the network controller, or may be integrated into the network controller.

According to the embodiments of the present disclosure, through the introduction of the local access server, the network control function and the network controller, it is able to effectively relieve the service processing burden of the core network, expand the network capacity and reduce the signaling overhead.

For ease of understanding, the present disclosure will be described hereinafter in conjunction with the embodiments.

Figure 6:
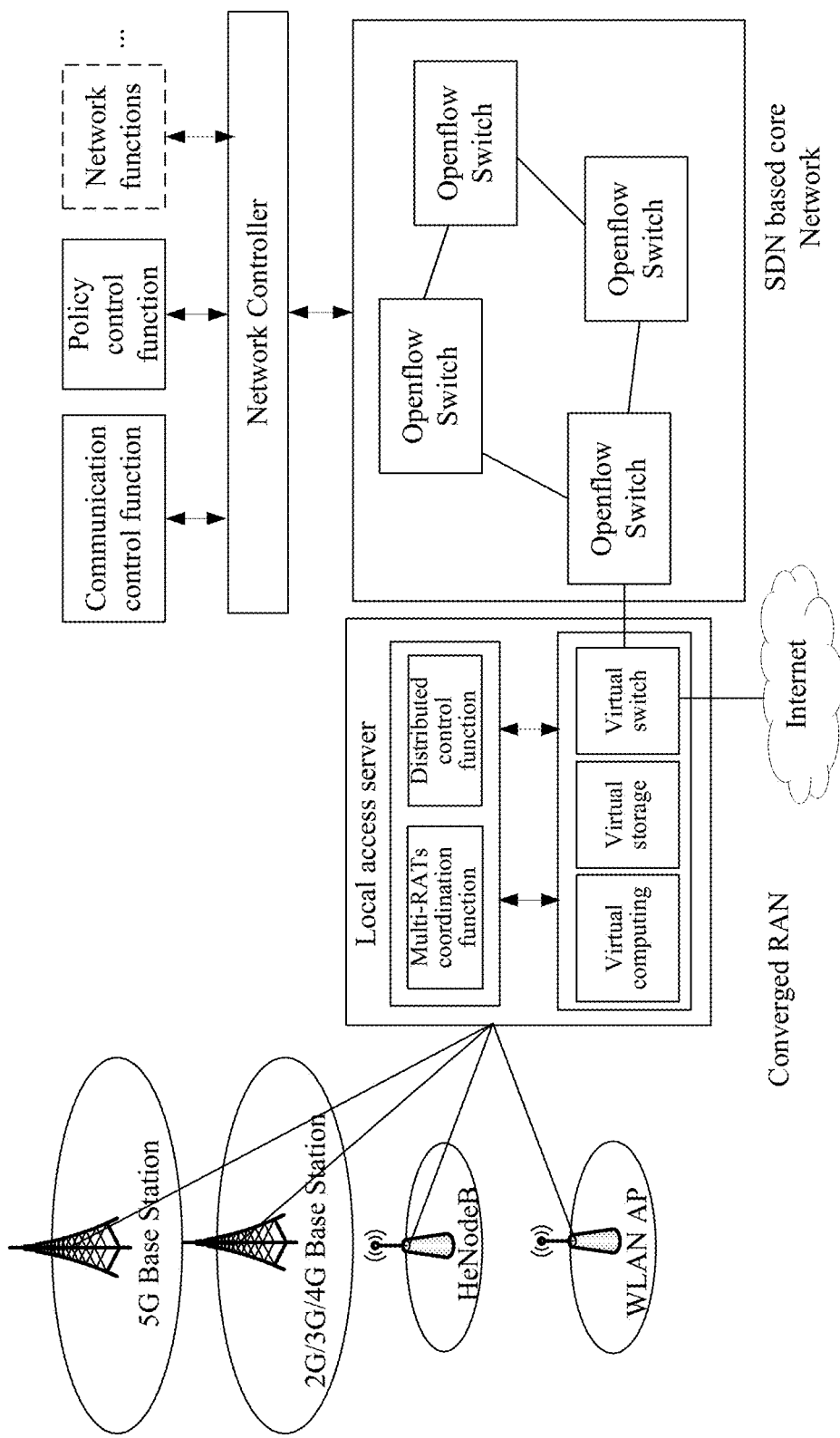
FIG. 6 is another block diagram of the mobile communication system according to one embodiment of the present disclosure.

In an alternative embodiment of the present disclosure, a network architecture of the mobile communication system on a hierarchical computing basis may refer to FIG. 6. An access network may consist of a base station and a local access server which is deployed with a multiple Radio Access Technologies (Multi-RATs) coordination function, a distributed control function, and a local access function (not shown). A core network may consist of a network control function, a network controller and a network forwarding device. The network control function may include a communication control function and a policy control function. The network forwarding device may include a real physical device and a virtual device. In addition, the local access server may further include a virtual computing, a virtual storage and a virtual switch. Moreover, the local access server is capable of communicating with a $5^{th}$-Generation (5G) base station, a $2^{nd}$-Generation (2G)/3G/$4^{th}$-Generation (4G) base station, a Home Evolved NodeB (HeNodeB), and a Wireless Local Area Network (WLAN) Access Point (AP), so as to achieve the Multi-RATs coordination. A SDN-based core network may include a plurality of Openflow switches.

According to the embodiments of the present disclosure, through the introduction of such entities as the local access server, the network control function and the network controller into the mobile communication system, it is able to reduce, to some extent, the signaling overhead in the core network and relieve the service processing burden on the core network due to a large number of terminals, thereby to improve the system performance and ensure the network connectivity.

However, it should be appreciated that, during the actual application, the network forwarding device may completely be a real physical device, or a virtual device, or a combination thereof, which will not be particularly defined herein.

During the actual application, the local access server may be located at an edge of a service provider's network, and it is capable of providing services for all radio access points that have accessed to the local access server. The coverage of the wireless access points served by the local access server constitutes a service area of the local access server. In addition, during the actual application, for the local access server, logic may be separated from hardware through the NFV technique mentioned in the background, and at this time, upper-layer software control logic is independent of a dedicated hardware resource, so as to improve the universality of the network devices. Further, through the intelligent arrangement of the network functions, it is able to improve the extendibility of the network, which will not be particularly defined herein.

In an alternative embodiment of the present disclosure, the local access server may receive a request from a terminal; determine, in accordance with the request type, whether or not the request needs to be forwarded to a network control function (corresponding to the above-mentioned control module, the same below); in the case of a positive determination result, forward the request to the network control function; and otherwise, process and respond to the request from the terminal.

In addition, in the case that the request received by the network control function form the terminal is a connection/session establishment request, the network control function may calculate a QoS parameter in accordance with user subscription data, or service characteristics, or both, so as to control local communication authorization in accordance with such information as subscription attributes of an end user. Then, the network control function may request a path establishment module to establish a forwarding path in accordance with the QoS parameter, and request the local access server to establish a radio connection using the QoS parameter. The QoS parameter may be acquired by the network control function by negotiating with the local access server, and the radio connection may be established in accordance with the negotiated QoS parameter.

On one hand, the path establishment module of the network controller may establish the forwarding path in accordance with a device state reported by the network forwarding device itself, network topology and a request from the network control function.

On the other hand, the network forwarding device may configure the forwarding path in accordance with a request from the communication control function, so as to establish the communication connection. The network controller is capable of installing a data forwarding rule in advance to the network forwarding device, or acquiring the data forwarding rule (e.g., by downloading from a network) and then installing it to the network forwarding device, so as to establish the communication connection.

In addition, the local access server may also be configured to match and schedule virtual radio resources in accordance with the QoS parameter, so as to improve the system capacity.

In addition, in an alternative embodiment of the present disclosure, the local access server may be further configured to select an access technology, and establish an air-interface radio connection. The local access server may select the access technology in accordance with a service QoS requirement, or a current network state, or terminal information, or a combination thereof. The condition for the selection of the access technology will not be particularly defined herein, as long as the local access server may select the access technology in accordance therewith.

In another alternative embodiment of the present disclosure, the Multi-RATs coordination function of the local access sever may include monitoring features and statuses of the access technologies for the radio access network, and establishing the radio connection. During the actual application, in the case of the selection of the access technology, the radio connection may be established in accordance with the QoS requirement on the to-be-established connection, or the current network state, or the terminal information, or a combination thereof. In addition, the radio connection may also be established in accordance with any two of the QoS requirement on the to-be-established connection, the current network state and the terminal information, which will not be particularly defined herein.

In addition, in an alternative embodiment of the present disclosure, the local access function of the local access server may include enabling a local access function of the user plane with respect to data traffic that matches a rule for local access, so as to locally route the data traffic.

The network control function (the control module) may be further divided into two entities, i.e., a communication control function and a policy control function (the two entities will be described hereinafter, they may serve as accessory devices of, or may be integrated into, the network controller or the control module, and they may each refer to a set of functions, or an entity corresponding to the functions). The local access function may be enabled through the communication control function of the local access server or the control module. The communication control function may be further configured to require the network control function to enable the local access server by configuring a forwarding path rule.

In another alternative embodiment of the present disclosure, the policy control function may include at least one of being aware of the service characteristics and user's requirements, calculating the QoS parameters for the transmission connection in accordance with the user subscription characteristics, operator's policies and network configurations, being aware of QoS requirements of an application layer, and dynamically adjusting the QoS parameters in accordance with the varied QoS requirements.

In an alternative embodiment of the present disclosure, the local access server may be further configured to control the direct communication for a local terminal, and perform location management and handover management within the service area of the local access server. For a terminal that has accessed to the network, in the case that it moves within the service area of the local access server, the resultant mobile management signaling may be terminated on the local access server, so as to reduce the signaling overhead of the core network. In addition, the service area of the local access server refers to the coverage of the access points served by the local access server. In the case that the terminal moves within the service area of the local access server, the local access may take charge of the location management and the handover management.

In an alternative embodiment of the present disclosure, the communication control function may also be used to achieve such functions as access control, authentication and authorization, connection management, and location management and handover management across the local access servers. In the case that the local access server which serves the terminal is varied due to the movement of the terminal, the change of the local access server needs to be varied through the communication control function. In addition, it should be appreciated that, during the actual application, the communication control function may be used to achieve one or more of the above-mentioned functions, which will not be particularly defined herein.

The connection management may be used to: establish the transmission connection in accordance with the request from the terminal and the QoS parameter provided by the policy control function, so as to meet the QoS requirement on the service; and perform QoS modification or cancellation for the transmission connection in accordance with the request form the terminal or a QoS change request from the policy control function.

Figure 7:
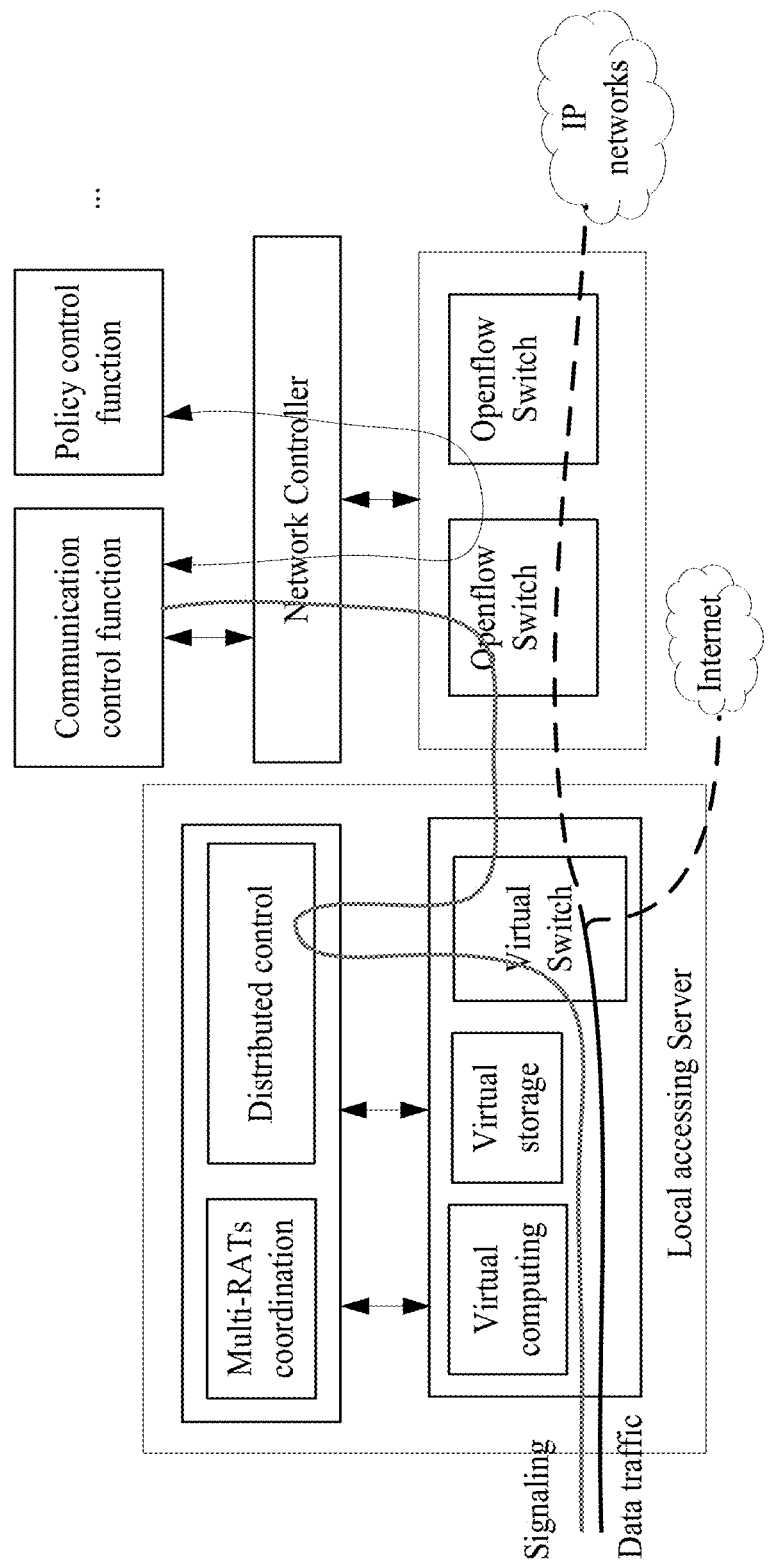
FIG. 7 is a schematic view showing interfaces in the mobile communication system in FIG. 6.
Figure 8:
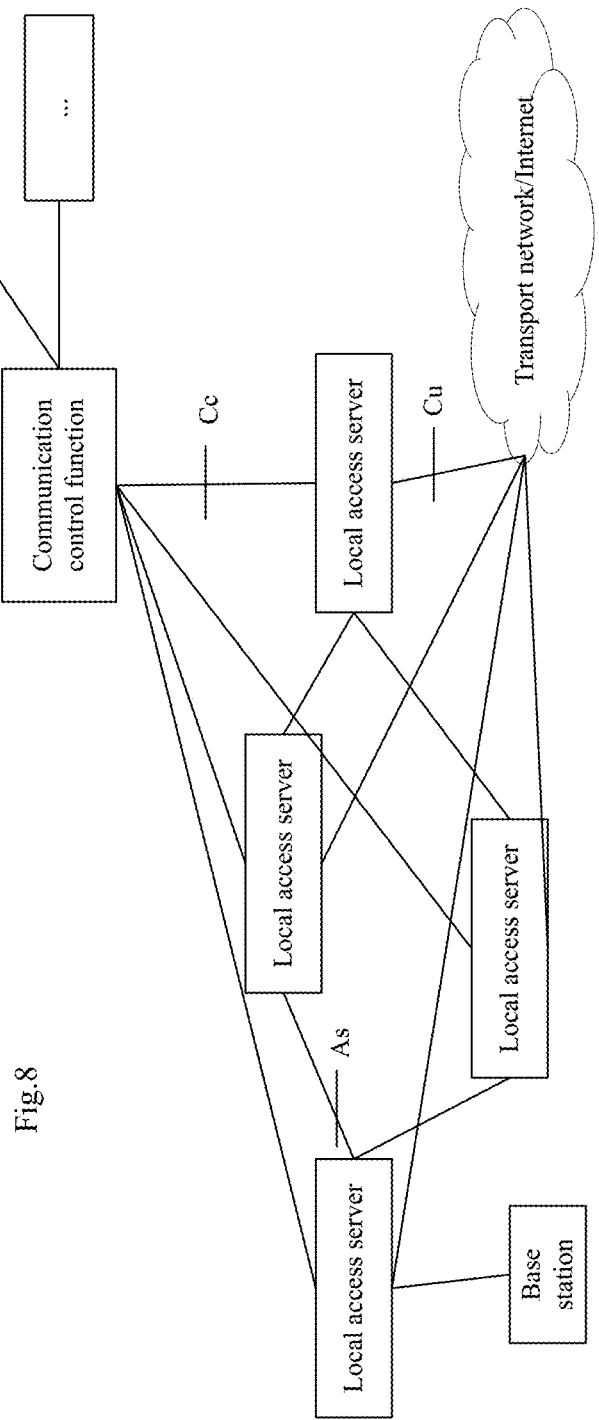
FIG. 8 is a schematic view showing the communication establishment and data transmission through the mobile communication system according to one embodiment of the present disclosure.

FIGS. 7 and 8 show communication interfaces for the system architecture in FIG. 6, where Cc represents a control plane interface, i.e., an interface between the access server and the communication control function of the core network, Cu represents a user plane interface, e.g., an interface between a gateway of the access server and a transport network or Internet, and As represents a logic interface between the access servers and includes a control plane AS-c interface and a user plane As-u interface.

The data transmission for the mobile communication system in the embodiments of the present disclosure will be described hereinafter in conjunction with FIG. 8.

First Embodiment

At first, the terminal may send a request to the local access server. The local access server may determine, in accordance with the request type, whether or not the request needs to be forwarded to the communication control function, and if yes, forward the request to the communication control function.

Then, the communication control function may request the policy control function to provide information about the QoS parameter in the case that the request from the terminal is a connection/session establishment request.

Next, the policy control function may calculate the QoS parameter in accordance with such information as the service characteristics and terminal subscription characteristics, and feed back the QoS parameter to the communication control function.

Next, the communication control function may receive the QoS parameter, request the local access server to select the access technology in accordance with the QoS parameter, establish the air interface radio connection, and in the case of no data distribution, request the network controller to calculate the forwarding path in accordance with the QoS parameter.

Next, the network controller may calculate a path rule, and install the path rule to the forwarding device on the path.

Next, the communication control function may send a response message to the terminal via the local access server.

Finally, the data traffic may be forwarded via the established radio connection and the forwarding path.

Second Embodiment

At first, the terminal may send a request to the local access server. The local access may determine, in accordance with the request type, whether or not the request needs to be forwarded to the communication control function, and if yes, forward the request to the communication control function.

Then, the communication control function may, in the case that the request from the terminal is a connection/session establishment request, request the policy control function to provide information about the QoS parameter, and calculate a forwarding path in accordance with the QoS parameter.

Next, the communication control function may request the local access server to establish the radio connection in accordance with the QoS parameter.

Next, the local access server may match and schedule virtual radio resources in accordance with the QoS parameter, and then send a feedback message to the communication control function.

Next, the local access server may receive the feedback message, and send a response message to the terminal.

Finally, the data traffic may be forwarded via the established radio connection and the forwarding path.

Figure 9:
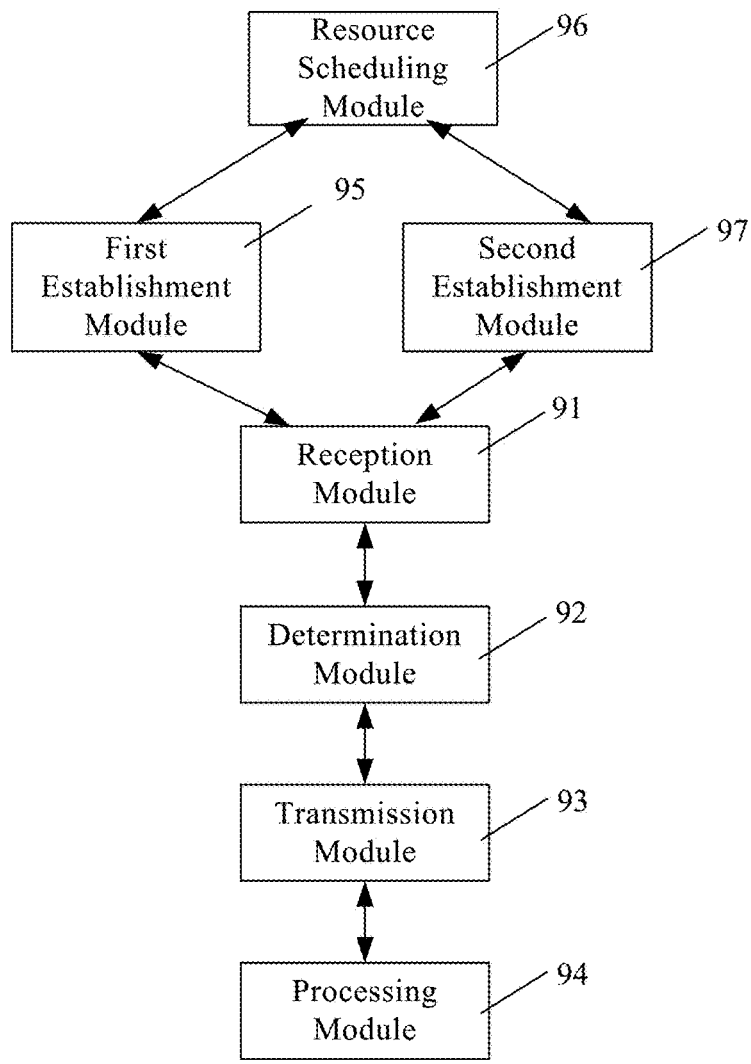
FIG. 9 is a block diagram of a local access server according to one embodiment of the present disclosure.

As shown in FIG. 9, which is a block diagram of a local access server in the embodiments of the present disclosure, the local access server may include: a reception module 91 configured to receive a request from a terminal; a determination module 92 configured to determine, on the basis of the request type, whether or not the request needs to be forwarded to a control module; a transmission module 93 configured to, in the case of a positive determination result, forward the request to the control module; and a processing module 94 configured to, in the case of a negative determination result, process and respond to the request from the terminal.

In an alternative embodiment of the present disclosure, the local access server may further include a first establishment module 95 configured to, in the case that the request is a connection/session establishment request, negotiate with the control module to determine a QoS parameter, and establish a radio connection in accordance with the determined QoS parameter.

In addition, the local access server may further include a resource scheduling module 96 configured to match and schedule virtual radio resources in accordance with the QoS parameter.

In addition, the local access server may further include a second establishment module 97 configured to select an access technology, and establish an air interface radio connection. The second establishment module 97 is further configured to select the access technology in accordance with at least one of a service QoS requirement, a current network state and terminal information.

In addition, the local access server may further include a coordination module configured to achieve a multi-RATs coordination function, an access module configured to achieve a local access function, and a distributed control module configured to achieve distributed network control.

The coordination module is further configured to monitor characteristics and stats of various access technologies in a radio access network, and establish the radio connection in accordance with the QoS requirement on the established connection, and/or the current network state and/or the terminal information. The access module is further configured to enable the local access function for the user plane with respect to data traffic that matches a rule for local access. The distributed control module is further configured to control the direction communication of the local terminal, and perform location management and handover management within a service area of the local access server.

Figure 10:
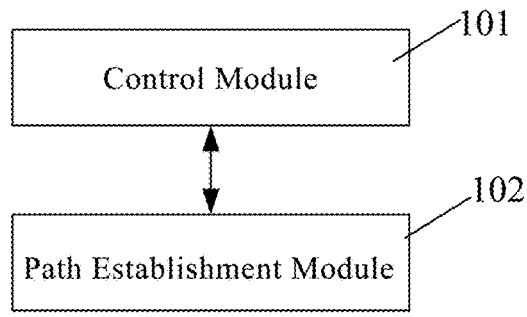
FIG. 10 is a block diagram of a network controller according to one embodiment of the present disclosure.

As shown in FIG. 10, the present disclosure further provides in some embodiments a network controller, which includes: a control module 101 configured to achieve a communication control function and a policy control function, receive a connection/session establishment request from a local access server, calculate a QoS parameter in accordance with user subscription data and/or service characteristics, establish a forwarding path in accordance with the QoS parameter, and request the local access server to establish a radio connection using the QoS parameter; and a path establishment module 102 configured to establish and configure a forwarding path.

The control module 101 is further configured to receive a connection/session establishment request from the local access server, calculate the QoS parameter in accordance with the user subscription data and/or the service characteristics, request the path establishment module 102 to establish the forwarding path using the QoS parameter, and request the local access server to establish the radio connection using the QoS parameter.

In addition, the control module 101 is further configured to negotiate with the local access server to acquire the QoS parameter, and establish the radio connection in accordance with the negotiated QoS parameter.

In addition, the control module 101 is further configured to enable a local access function of the local access server by configuring a forwarding path rule.

In addition, the policy control function may include at least one of being aware of the service characteristics, being aware of the user's requirements, calculating the QoS parameter for the transmission connection in accordance with the user subscription characteristics, and/or an operator's policy and/or network configurations, being aware of a QoS requirement of an application layer, and dynamically adjusting the QoS parameter in accordance with the varied QoS requirement.

In addition, the communication control function may include at least one of access control, authentication and authorization, connection management, and location management and handover management across the local access servers.

In addition, the path establishment module 102 is further configured to establish the forwarding path in accordance with network topology, a state of a network forwarding device and a request from the control module 101.

Figure 11:
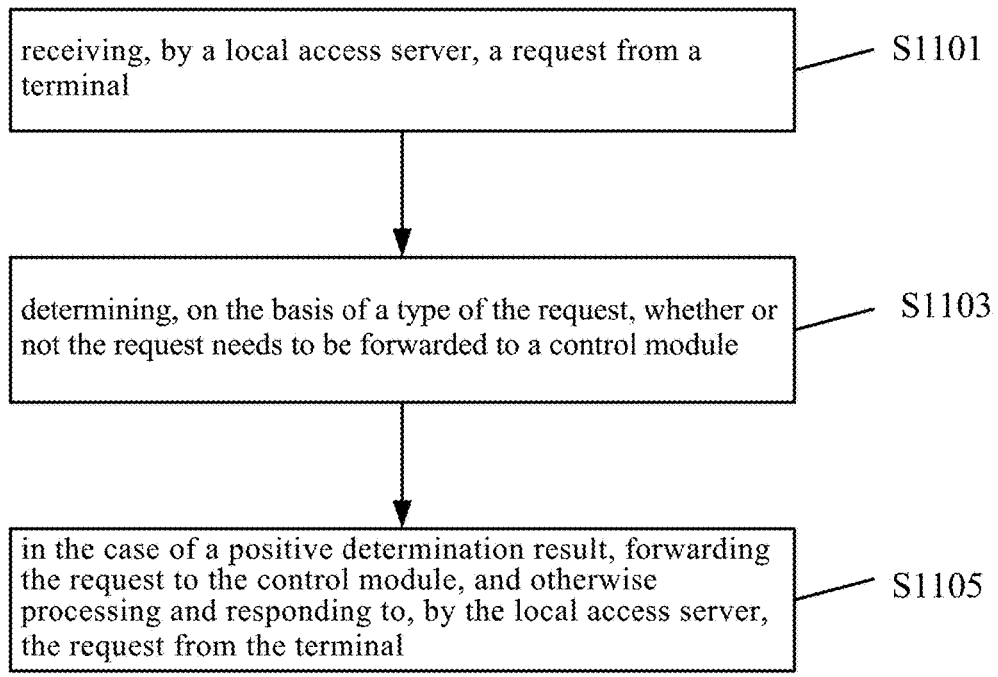
FIG. 11 is a flow chart of an implementation method for mobile communication according to one embodiment of the present disclosure.

The present disclosure further provides in some embodiments an implementation method for mobile communication, which, as shown in FIG. 11, may include: Step S1101 of receiving, by a local access server, a request from a terminal; Step 1103 of determining, by the local access server, whether or not the request needs to be forwarded to the control module 101 on the basis of the request type; and Step S1105 of, in the case of a positive determination result, forwarding, by the local access network, the request to the control module 101, otherwise processing and responding to, by the local access server, the request from the terminal.

In addition, the implementation method may further include, in the case that the request is a connection/session establishment request, negotiating, by the local access server, with the control module 101 to determine a QoS parameter, and establishing a radio connection in accordance with the determined QoS parameter.

In addition, the implementation method may further include enabling a local access function for a user plane with respect to data traffic that matches a rule for local access.

Figure 12:
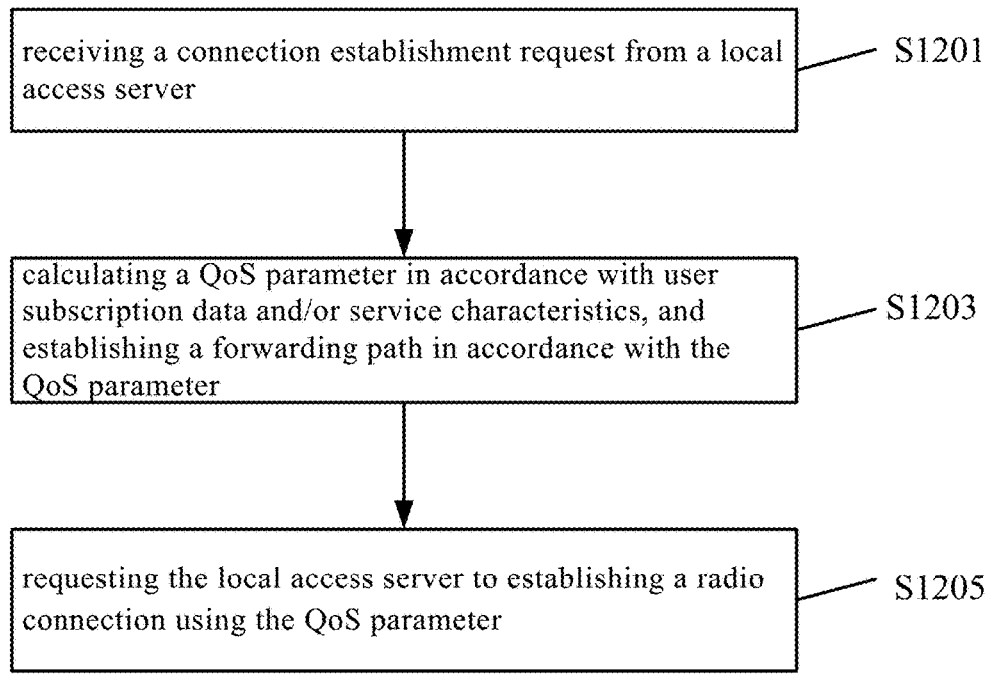
FIG. 12 is a flow chart of an implementation method for mobile communication according to one embodiment of the present disclosure.

The present disclosure further provides in some embodiments an implementation method for mobile communication which, as shown in FIG. 12, may include: Step S1201 of receiving a connection/session establishment request from a local access server; Step S1203 of calculating a QoS parameter in accordance with user subscription data and/or service characteristics, and establishing a forwarding path in accordance with the QoS parameter; and Step S1205 of requesting the local access server to establish a radio connection using the QoS parameter.

In addition, the implementation method may further include negotiating with the local access server to acquire the QoS parameter, and establishing the radio connection in accordance with the negotiated QoS parameter.

In addition, during the establishment, the forwarding path may be established in accordance with network topology, a state of a network forwarding device and a request from a control module.

In a word, the communication system architecture in the embodiments of the present disclosure will have the following advantages. 1. It is able to reduce the signaling overhead of the core network in terms of the architecture, thereby to relieve the processing burden on the core network in the case of a large number of terminals that have accessed to the core network. 2. Through a large number of distributed local access gateways, it is able to improve the routing efficiency, thereby to reduce the risk of gateway overload. 3. For the mobile management processes and the centralized session management processes in a centralized architecture, all the signaling is processed by nodes in the core network, so the signaling overhead of the core network, the backhaul load and the signaling overhead between the nodes in the core network may increase. However, in a hierarchical architecture, the signaling for the mobile management and the session management caused by the local movement of the terminal may be terminated at the local access server, so it is able to reduce the signaling overhead of the core network. 4. As compared with the known system where some coordination mechanism for the upper-layer, static multi-RATs may exist, the multi-RATs coordination in the architecture of the present disclosure intends to be implemented at a bottom layer, and the radio transmission resources is desired to be scheduled by the local access server in accordance with the service characteristics and the QoS requirements on the transmission, so as to improve the system capacity.

A basic principle of the present disclosure has been described hereinbefore in conjunction with the embodiments. However, it should be appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future.

Figure 13:
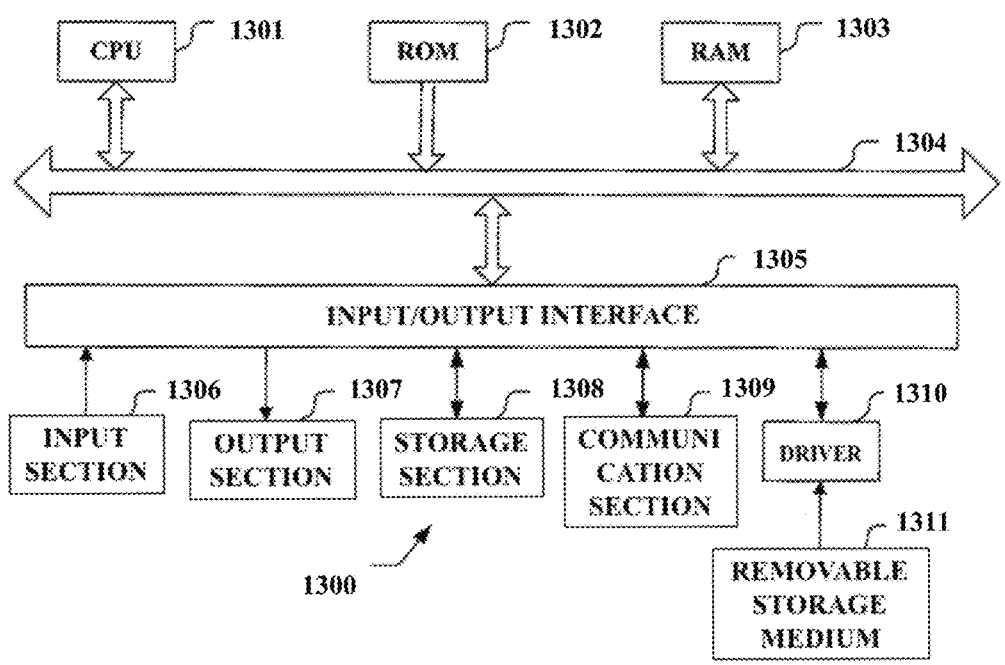
FIG. 13 is a block diagram of a computer system according to one embodiment of the present disclosure.

In the case that the present disclosure is implemented in the form of software and/or firmware, programs may be installed in a computer with a dedicated hardware structure, e.g., a general-purpose computer 1300 in FIG. 13, via the storage medium or a network, so as to achieve various functions.

In FIG. 13, a Central Processing Unit (CPU) 1301 may execute various processings in accordance with the programs stored in a Read Only Memory (ROM) 1302 or the programs loaded into a Random Access Memory (RAM) 1303 via a storage section 1308. Data desired for the operation of the CPU 1301 may also be stored in the RAM 1303 according to the practical need. The CPU 1301, the ROM 1302 and the RAM 1303 are connected to each other via a bus 1304. In addition, an input/output interface 1305 is also connected to the bus 1304.

An input section 1306 (including a keyboard and a mouse), an output section 1307 (including a display such as Cathode Ray Tube (CRT) or a Liquid Crystal Display (LCD), and a speaker), a storage section 1308 (including a hard disk) and a communication section 1309 (including a network interface card such as Local Area Network (LAN) card, and a Modem) may also be connected to the input/output interface 1305. The communication section 1309 is configured to perform the communication over a network, e.g., Internet.

If desired, a driver 1310 may also be connected to the input/output interface 1305, and a removable storage medium 1311 such as a magnetic disk, an optical disk, a magneto-optical disk or a semiconductor memory may be installed on the driver 1310, so as to read the computer programs therefrom and install them into the storage section 1308.

In the case that the above-mentioned processings are implemented via software, the programs may be installed from the network, e.g., Internet, or the storage medium, e.g., the removable storage medium 1311.

It should be appreciated that, the storage medium is not limited to the removable storage medium 1311 in FIG. 13 in which the programs are stored and which may be distributed in such a manner as to be detachable from the device so as to provide the programs to a user. The removable storage medium 1311 may include a magnetic disk (including a floppy disk (registered trademark), an optical disk (including Compact Disk Read Only Memory (CD-ROM) and Digital Video Disk (DVD), a magneto-optical disk (including Mini Disk (registered trademark) and a semiconductor memory. Alternatively, the storage media may be a hard disk included in the storage section 1308 and the ROM 1302 in which the programs are stored, and the storage media may be distributed to the user together with the device including them.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

Although the present disclosure and its advantages have been described hereinabove, it should be appreciated that, various modifications, substitutions and alternations may be further made without departing from the spirit and scope defined by the appended claims. Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

What is claimed is:

1. A mobile communication system, comprising:
   a local access server configured to achieve a multiple Radio Access Technologies (Multi-RATs) coordination function, a local access function and distributed network control; and
   a network controller configured to achieve a communication control function and a policy control function, and establish and configure a forwarding path,
   wherein the network controller comprises: a first control circuit configured to achieve the communication control function and the policy control function, wherein the local access server is configured to receive a request from a terminal, determine, on the basis of the request type, whether or not the request needs to be forwarded to the first control circuit, if yes, forward the request to the first control circuit, and otherwise process and respond to the request from the terminal.

2. The mobile communication system according to claim 1, wherein
   the first control circuit is further configured to receive a connection/session establishment request from the local access server, calculate a Quality of Service (QoS) parameter in accordance with user subscription data and/or service characteristics, establish the forwarding path in accordance with the QoS parameter, and request the local access server to establish a radio connection using the QoS parameter; and
   a path establishment circuit configured to establish and configure the forwarding path.

3. The mobile communication system according to claim 1, wherein the first control circuit is further configured to, in the case that the request from the terminal is the connection/ session establishment request, calculate the QoS parameter in accordance with user subscription data and/or service characteristics, request the path establishment circuit to establish the forwarding path in accordance with the QoS parameter, and request the local access server to establish radio connection using the QoS parameter.

4. The mobile communication system according to claim 3, wherein the network controller negotiates with the local access server to acquire the QoS parameter, and establishes the radio connection in accordance with the negotiated QoS parameter.

5. The mobile communication system according to claim 3, wherein the local access server is further configured to select an access technology and establish an air interface radio connection,
the mobile communication system further comprises a network forwarding device configured to configure the forwarding path in accordance with a request from the first control circuit to establish a communication connection, and
the path establishment circuit is configured to install in advance a data forwarding rule into the network forwarding device for the establishment of the communication connection.

6. The mobile communication system according to claim 5, wherein the local access server is configured to select an access technology in accordance with at least one of a service QoS requirement, a current network state, and terminal information.

7. The mobile communication system according to claim 5, wherein the network forwarding device includes a physical device and/or a virtual device.

8. The mobile communication system according to claim 3, wherein the local access server is further configured to match and schedule virtual radio resources in accordance with the QoS parameter.

9. The mobile communication system according to claim 1, wherein the multi-RATs coordination function of the local access server comprises monitoring features and statuses of a radio access network with various access technologies, and establishing the radio connection in accordance with at least one of the QoS requirement for the established connection, the current network state and the terminal information.

10. The mobile communication system according to claim 2, wherein the local access function of the local access server comprises enabling the local access function for a user plane with respect to data traffic that matches a rule for local access.

11. The mobile communication system according to claim 10, wherein the local access function of the local access server is enabled by the local access server or the first control circuit, and the first control circuit is further configured to enable the local access server in accordance with a forwarding path rule.

12. The mobile communication system according to claim 1, wherein the policy control function comprises at least one of being aware of the service characteristics, being aware of user's requirement, calculating the QoS parameter for the transmission connection in accordance with user subscription characteristics and/or operator's policies and/or network configurations, being aware of a QoS requirement of an application layer, and dynamically adjusting the QoS parameter in accordance with the varied QoS requirement.

13. The mobile communication system according to claim 1, wherein the local access server is further configured to control over direct communication among terminals, and perform location management and handover management within a service area of the local access server.

14. The mobile communication system according to claim 1, wherein the communication control function comprises at least one of access control, authentication and authorization, connection management, and location management and handover management among local access servers.

15. The mobile communication system according to claim 2, wherein the path establishment circuit is further configured to establish the forwarding path in accordance with network topology, a state of the network forwarding device, and a request from the network controller.

16. An implementation method for mobile communication, comprising steps of:
receiving, by a local access server, a request from a terminal, wherein the local access server configured to achieve a multiple Radio Access Technologies (Multi-RATs) coordination function, a local access function and distributed network control;
determining, on the basis of the request type, whether or not the request needs to be forwarded to a first control circuit of a network controller, wherein the network controller configured to achieve a communication control function and a policy control function, and establish and configure a forwarding path; and
if yes, forwarding the request to the first control circuit, and otherwise processing and responding to, by the local access server, the request from the terminal.

17. The implementation method according to claim 16, further comprising:
in the case that the request is a connection/session establishment request, negotiating, by the local access server, with the first control circuit to determine a Quality of Service (QoS) parameter, and establishing a radio connection in accordance with the determined QoS parameter; and
enabling a local access function for a user plane with respect to data traffic that matches a rule for local access.

18. The implementation method according to claim 16, further comprising steps of:
receiving, by the first control circuit a connection/session establishment request from a local access server;
calculating a Quality of Service (QoS) parameter in accordance with user subscription data and/or service characteristics, and establishing a forwarding path in accordance with the QoS parameter; and
requesting the local access server to establish a radio connection using the QoS parameter.

19. The implementation method according to claim 18, further comprising acquiring the QoS parameter by negotiating with the local access server, and establishing the radio connection in accordance with the negotiated QoS parameter;
wherein the forwarding path is determined in accordance with network topology, a status of a network forwarding device and a request from a first control circuit.

* * * * *